(12) United States Patent
Song et al.

(10) Patent No.: US 10,644,751 B2
(45) Date of Patent: May 5, 2020

(54) COEXISTENCE COMMUNICATION METHOD FOR LOW-POWER BROADBAND COMMUNICATION AND SYSTEM THEREOF

(71) Applicant: Korea Advanced Institute of Science and Technology, Daejeon (KR)

(72) Inventors: Nah-Oak Song, Daejeon (KR); Byung-Jae Kwak, Daejeon (KR)

(73) Assignee: Korea Advanced Institute of Science and Technology (KR)

( * ) Notice: Subject to any disclaimer, the term of this patent is extended or adjusted under 35 U.S.C. 154(b) by 0 days.

(21) Appl. No.: 16/504,976

(22) Filed: Jul. 8, 2019

(65) Prior Publication Data

US 2020/0021332 A1 Jan. 16, 2020

(30) Foreign Application Priority Data

Jul. 13, 2018 (KR) .................. 10-2018-0081840
Oct. 11, 2018 (KR) .................. 10-2018-0121104

(51) Int. Cl.
*H04B 3/54* (2006.01)
*H04J 3/16* (2006.01)

(52) U.S. Cl.
CPC .............. *H04B 3/544* (2013.01); *H04B 3/54* (2013.01); *H04B 3/542* (2013.01); *H04J 3/16* (2013.01); *H04B 2203/5408* (2013.01)

(58) Field of Classification Search
CPC .......... H04B 3/544; H04B 3/54; H04B 3/542; H04B 2203/5408; H04J 3/16
See application file for complete search history.

(56) References Cited

U.S. PATENT DOCUMENTS

| 2009/0174532 A1* | 7/2009 | Galli | H04B 3/544 340/12.32 |
| 2010/0074243 A1* | 3/2010 | Yonge, III | H04B 7/2656 370/343 |

FOREIGN PATENT DOCUMENTS

KR 10-2014-0065159 A 5/2014

OTHER PUBLICATIONS

Extended European Search Report for related Application No. 19185215.1 dated Sep. 27, 2019.
(Continued)

*Primary Examiner* — Nam T Huynh
(74) *Attorney, Agent, or Firm* — Burns & Levinson, LLP; Joseph M. Maraia

(57) ABSTRACT

A coexistence communication method for broadband power line communication that allocates a resource of another heterogeneous system to a blank resource in data where a plurality of heterogeneous systems are allocated to time division multiplex units (TDMUs) in a distribution scheme and a system therefor are provided. The method includes detecting a blank resource according to a heterogeneous system which does not share a power line among a plurality of heterogeneous systems, from data in which the plurality of heterogeneous systems which share the power line to perform power line communication are allocated to a plurality of TDMUs and in which each TDMU is allocated to a plurality of time division multiplex slots (TDMSs) sorted over time in a distribution scheme and allocating added another heterogeneous system to the blank resource.

17 Claims, 17 Drawing Sheets

(56) References Cited

OTHER PUBLICATIONS

IEEE: "IEEE Standard for Broadband over Power Line Networks: Medium Access Control and Physical Layer Specifications Sponsored by the Standards Committee IEEE Communications Society," Dec. 30, 2010, Chapters 15 and 16, pp. 1291-1325, XP055357443, retrieved from the Internet: URL:https://ieeexplore.ieee.org/stamp/stamp.isp?arnumber=5678772.

* cited by examiner

FIG. 1B

| Phase vector | Start No. | Use |
|---|---|---|
| Phase 1 | 1 | acc |
| Phase 2 | 2 | IH-W and resync |
| Phase 3 | 14 | IH-O and resync |
| Phase 4 | 42 | accand FDMinterference |
| Phase 5 | 58 | IH-G and resync |

FIG. 5

| Index | ISP Field ACC | IH-W | IH-O | IH-G | BW | TDM Slot number 0 | 1 | 2 | 3 | 4 | 5 | 6 | 7 |
|---|---|---|---|---|---|---|---|---|---|---|---|---|---|
| 1 | - | IH-W | IH-O | IH-G | | IH-A | IH-A | IH-A | IH-A | IH-A | IH-A | IH-A | IH-A |
| 2 | - | IH-A | - | - | | IH-A | IH-A | IH-G | IH-A | IH-A | IH-G | IH-G | IH-G |
| 3 | - | IH-W | - | IH-G | | IH-W | IH-W | IH-A | IH-A | IH-A | IH-W | IH-W | IH-O |
| 4 | - | IH-A | IH-A | - | | IH-W | IH-W | IH-O | IH-O | IH-O | IH-A | IH-O | IH-G |
| 5 | - | IH-A | IH-O | IH-G | | IH-A | IH-A | IH-A | IH-A | IH-A | IH-A | IH-A | IH-A |
| 6 | - | IH-A | IH-O | IH-A | | IH-A | IH-W | IH-A | IH-O | IH-A | IH-G | IH-A | IH-A |
| 7 | - | IH-A | IH-O | IH-G | | IH-A | IH-A | IH-G | IH-O | IH-A | IH-G | IH-G | IH-G |
| 8 | ACC | IH-A | IH-A | - | PB | IH-A | IH-A | IH-A | IH-A | ACC | ACC | IH-A | IH-A |
| 9 | ACC | IH-A | IH-A | - | FB | IH-A | IH-A | IH-A | ACC | ACC | ACC | ACC | IH-G |
| 10 | ACC | IH-A | IH-O | IH-G | PB | IH-A | IH-A | IH-G | IH-A | ACC | ACC | IH-G | IH-G |
| 11 | ACC | IH-A | IH-O | IH-G | FB | IH-A | IH-A | IH-G | ACC | ACC | ACC | ACC | IH-G |
| 12 | ACC | IH-W | IH-A | - | PB | IH-W | IH-W | IH-A | IH-A | ACC | ACC | IH-W | IH-A |
| 13 | ACC | IH-W | IH-O | - | FB | IH-W | IH-W | IH-O | ACC | ACC | ACC | ACC | IH-O |
| 14 | ACC | IH-A | IH-O | - | PB | IH-A | IH-A | IH-O | IH-A | ACC | ACC | IH-O | IH-O |
| 15 | ACC | IH-W | IH-O | - | FB | IH-W | IH-W | IH-O | ACC | ACC | ACC | ACC | IH-O |
| 16 | ACC | IH-W | IH-A | IH-G | PB | IH-W | IH-W | IH-A | IH-A | ACC | ACC | IH-G | IH-G |
| 17 | ACC | IH-W | IH-O | IH-G | FB | IH-W | IH-W | IH-O | ACC | ACC | ACC | ACC | IH-G |
| 18 | ACC | IH-W | IH-O | IH-A | PB | IH-W | IH-W | IH-O | IH-A | ACC | ACC | IH-O | IH-O |
| 19 | ACC | IH-A | IH-A | IH-G | FB | IH-A | IH-A | IH-A | IH-O | ACC | ACC | IH-G | IH-A |
| 20 | ACC | IH-A | IH-O | IH-G | PB | IH-A | IH-A | IH-O | IH-A | ACC | ACC | IH-G | IH-G |
| 21 | ACC | IH-A | IH-O | IH-G | FB | IH-A | IH-A | IH-O | ACC | ACC | ACC | ACC | IH-G |

FIG. 8

| Index | ISP Field | | | | |
|---|---|---|---|---|---|
| | ACC | IH-W | IH-O | IH-G | BW |
| 1 | IH-A | IH-W | IH-O | IH-G | |

| TDM Slot number | | | | | | | |
|---|---|---|---|---|---|---|---|
| 0 | 1 | 2 | 3 | 4 | 5 | 6 | 7 |
| IH-W | IH-W | IH-O | IH-O | IH-A | IH-A | IH-G | IH-G |

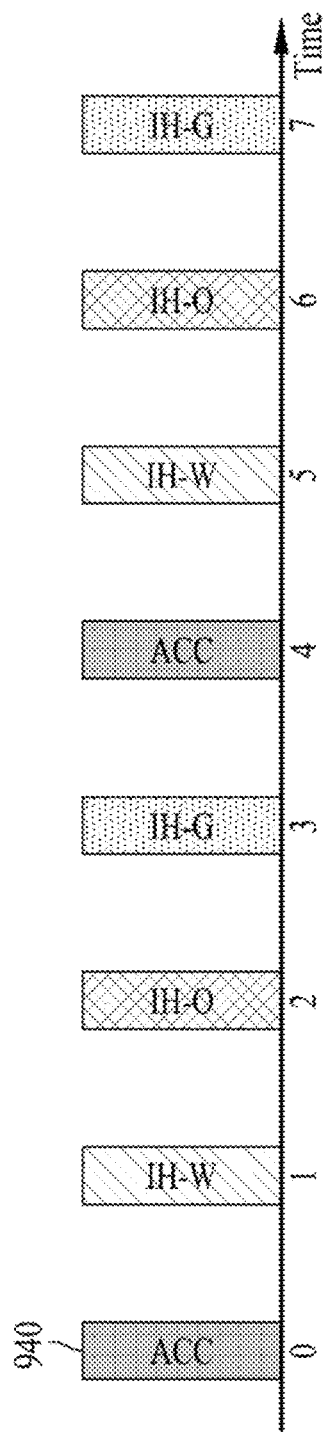

COEXISTENCE COMMUNICATION METHOD FOR LOW-POWER BROADBAND COMMUNICATION AND SYSTEM THEREOF

CROSS-REFERENCE TO RELATED APPLICATIONS

A claim for priority under 35 U.S.C. § 119 is made to Korean Patent Application No. 10-2018-0121104, filed on Oct. 11, 2018 and Korean Patent Application No. 10-2018-0081840 filed on Jul. 13, 2018, in the Korean Intellectual Property Office, the entire contents of which are hereby incorporated by reference.

BACKGROUND

Embodiments of the inventive concept described herein relate to a coexistence communication method for low-power broadband communication and a system thereof, and more particularly, relate to technologies of allocating a resource of another heterogeneous system to a blank resource in data where a plurality of heterogeneous systems are allocated to respective TDMUs in a distribution scheme.

The high-speed power line communication (KS X 4600-1 Class-A) technology developed in Korea was promulgated as an International Organization for Standardization (ISO) international standard. As Institute of Electrical and Electronics Engineers (IEEE) (P1901 and the like) and International Telecommunication Union (IT-U) (G.9960, G.9961, and the like) have proceeded with standardization for enacting organization and international standards with respect to the high-speed power line communication, each draft standard has been released.

However, when heterogeneous systems using different protocols are installed and operated at the same time in a power line, signal interference or resource allocation by different standards may be a problem. Thus, the Standard Management Board (SMB) of International Electrotechnical Commission (IEC) requires a coexistence method capable of solving the signal interference or resource allocation problems of heterogeneous systems.

Korean Patent Laid-open Publication No. 10-2014-0065159 describes technologies, for efficiently allocating a resource slot with the concept of fair distribution to heterogeneous systems, which introduce a priority concept such that more resource slots are allocated to systems with much amount of traffic.

Herein, because the above-mentioned conventional technologies are technologies of introducing priority according to the number of nodes in heterogeneous systems, that is, the amount of traffic and allocating resources, the amount of calculation increases according to the complexity of the technologies.

SUMMARY

Embodiments of the inventive concept provide a method for efficiently allocating a resource slot by efficiently using a blank resource which does not share data, in data where a plurality of heterogeneous systems which communicate in a coexistence form on a power line are allocated in a distribution scheme.

According to an exemplary embodiment, a coexistence communication method for broadband power line communication may include detecting a blank resource according to a heterogeneous system which does not share a power line among a plurality of heterogeneous systems, from data in which the plurality of heterogeneous systems which share the power line to perform power line communication are allocated to a plurality of time division multiplex units (TDMUs) and in which each TDMU is allocated to a plurality of time division multiplex slots (TDMSs) sorted over time in a distribution scheme, allocating added another heterogeneous system to the blank resource, and detecting a resource of a conventional heterogeneous system included in a resource map among the plurality of heterogeneous systems, from data in which the other heterogeneous system allocated to the blank resource and the plurality of heterogeneous systems are allocated to the plurality of TDMSs in the distribution scheme.

The heterogeneous system which does not share the power line, the other heterogeneous system, and the conventional heterogeneous system may indicate periodicities of different ISP signals.

The detecting of the resource of the conventional heterogeneous system may include separately detecting a phase vector of the other heterogeneous system indicating periodically iterative allocation and a phase vector of the conventional heterogeneous system indicating continuous allocation.

The detecting of the blank resource may include redetecting the blank resource according to the heterogeneous system which does not share the power line among the plurality of heterogeneous systems, from data in which the plurality of heterogeneous systems which share the power line to perform the power line communication and the conventional heterogeneous system are allocated to the plurality of TDMSs in the distribution scheme. The allocating of the added other heterogeneous system to the blank resource may include allocating the added other heterogeneous system to the redetected blank resource.

The allocating of the added other heterogeneous system to the blank resource may include allocating the other heterogeneous system to a resource of an access system among the TDMSs in which the plurality of heterogeneous systems are allocated in the distribution scheme, when the blank resource is not redetected.

The detecting of the blank resource may include detecting a blank resource and a blank phase vector according to the heterogeneous system which does not share the power line, from data in which heterogeneous systems which share the power line among the plurality of heterogeneous systems are allocated to be continuous in one TDMU based on the resource map.

The resource map may indicate a map in which at least one or more of the plurality of heterogeneous systems which perform the power line communication are allocated to be continuous in 8 TDMSs in each of the plurality of TDMUs.

The allocating of the added other heterogeneous system to the blank resource may include allocating the other heterogeneous system which is not included in the plurality of heterogeneous systems to the blank resource and the blank phase vector.

According to an exemplary embodiment, a coexistence communication method for broadband power line communication may include detecting a blank resource according to a heterogeneous system which does not share a power line among a plurality of heterogeneous systems, from data in which the plurality of heterogeneous systems which share the power line to perform power line communication are allocated to a plurality of time division multiplex units (TDMUs) and in which each TDMU is allocated to a plurality of time division multiplex slots (TDMSs) sorted over time in a distribution scheme, allocating added another heterogeneous system to the blank resource, detecting a resource of a conventional heterogeneous system included in a resource map among the plurality of heterogeneous systems, from data in which the other heterogeneous system allocated to the blank resource and the plurality of heterogeneous systems are allocated to the plurality of TDMSs in the distribution scheme, allocating the detected conventional heterogeneous system and the plurality of heterogeneous systems to the plurality of TDMSs in the distribution scheme depending on the resource map, redetecting the blank resource according to the heterogeneous system which does not share the power line among the plurality of heterogeneous systems, from data in which the plurality of heterogeneous systems which share the power line to perform the power line communication and the conventional heterogeneous system are allocated to the plurality of TDMSs in the distribution scheme, and allocating the other heterogeneous system to the redetected blank resource.

The detecting of the resource of the conventional heterogeneous system may include separately detecting a phase vector of the other heterogeneous system indicating periodically iterative allocation and a phase vector of the conventional heterogeneous system indicating continuous allocation.

The allocating of the redetected blank resource may include allocating the other heterogeneous system to a resource of an access system among the TDMSs in which the plurality of heterogeneous systems are allocated in the distribution scheme, when the blank resource is not redetected.

According to an exemplary embodiment, a coexistence communication system for broadband power line communication may include a detection unit that detects a blank resource according to a heterogeneous system which does not share a power line among a plurality of heterogeneous systems, from data in which the plurality of heterogeneous systems which share the power line to perform power line communication are allocated to a plurality of time division multiplex units (TDMUs) and in which each TDMU is allocated to a plurality of time division multiplex slots (TDMSs) sorted over time in a distribution scheme, an allocation unit that allocates added another heterogeneous system to the blank resource, and a processing unit that updates at least one or more of the plurality of heterogeneous systems which are allocated or changed to a plurality of 8 TDMSs included in each TDMU with respect to the plurality of TDMUs, a conventional heterogeneous system, and the other heterogeneous system to a resource map.

The heterogeneous system which does not share the power line, the other heterogeneous system, and the conventional heterogeneous system may indicate periodicities of different ISP signals.

The detection unit may detect a resource of the conventional heterogeneous system included in the resource map among the plurality of heterogeneous systems, from data in which the other heterogeneous system allocated to the blank resource and the plurality of heterogeneous systems are allocated to the plurality of TDMSs in the distribution scheme.

The detection unit may redetect the blank resource according to the heterogeneous system which does not share the power line among the plurality of heterogeneous systems, from data in which the plurality of heterogeneous systems which share the power line to perform the power line communication and the conventional heterogeneous system are allocated to the plurality of TDMSs in the distribution scheme.

The detection unit may separately detect a phase vector of the other heterogeneous system indicating periodically iterative allocation and a phase vector of the conventional heterogeneous system indicating continuous allocation.

The allocation unit may allocate the added other heterogeneous system to the redetected blank resource.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIGS. 1A and 1B are drawings illustrating a standard inter symbol protocol (ISP);

FIG. 5 is a drawing illustrating a resource map according to an embodiment of the inventive concept;

FIG. 8 is a drawing illustrating a resource map according to another embodiment of the inventive concept;

FIGS. 9A, 9B, and 9C are drawings illustrating an example of allocating another heterogeneous system to a resource of an access system according to another embodiment of the inventive concept.

DETAILED DESCRIPTION

Figure 1A:
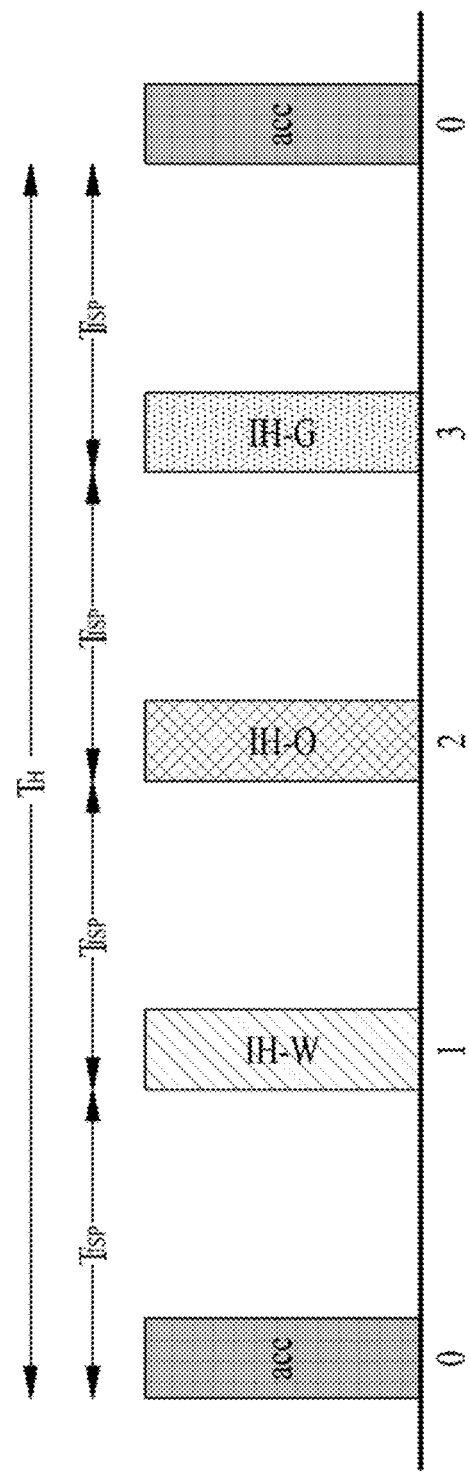

Hereinafter, a description will be given in detail of embodiments with reference to the accompanying drawings. However, the present disclosure is restricted or limited to embodiments of the present disclosure. Further, like reference numerals shown in each drawing indicates like members.

Further, the terminology used in the specification may be terms used to properly represent an exemplary embodiment of the present disclosure and may vary according to intention of a user or an operator or custom of a field included in the present disclosure. Therefore, the terminology will be defined based on contents across the specification.

FIGS. 1A and 1B are drawings illustrating a standard inter symbol protocol (ISP).

Referring to FIGS. 1A and 1B, an ISP may support to use a maximum of 4 non-interoperable systems (hereinafter referred to as "heterogeneous systems") at the same time.

In this case, the heterogeneous system may include one access system ACC and 3 in-home systems IH-W, IH-O, and IH-G. Furthermore, a plurality of heterogeneous systems in the ISP indicate 5 phase vectors. There is an ISP window in TDMS #0 of each of all TDMU #0, #3, #6, and #9.

In this case, the entire period may be indicative of including periods between 4 phase vectors ($T_H=4*T_{ISP}$).

Figure 2A:
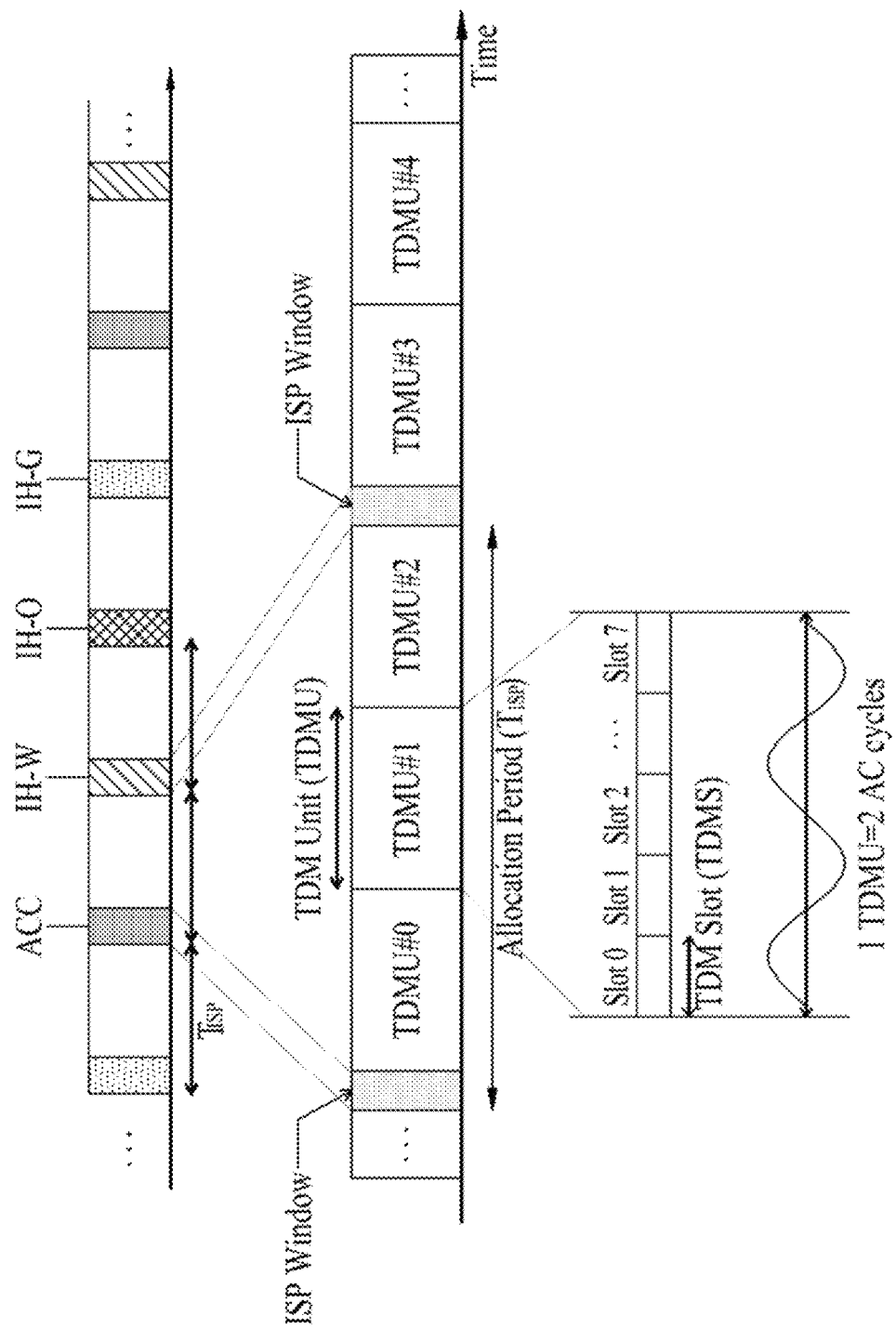
FIGS. 2A and 2B are drawings illustrating a resource allocation scheme.
Figure 2B:
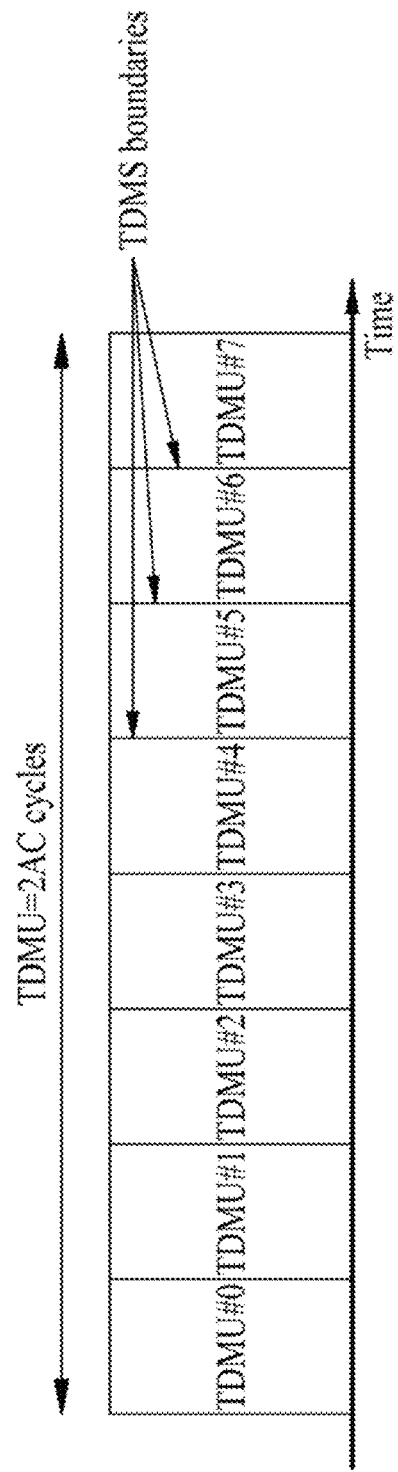

FIGS. 2A and 2B are drawings illustrating a resource allocation scheme.

Referring to FIGS. 2A and 2B, in a resource allocation scheme proposed as a standard, a period of an ISP common signal for synchronization of heterogeneous systems, that is, a period between ISP windows may be divided into 3 TDMUs which resource units. Each of TDMU #0, TDMU #1, TDMU #2, TDMU #3, and TDMU #4 may be divided into 8 TDMSs which are resource slots over time.

Thus, a plurality of heterogeneous systems (e.g., ACC, IH-W, IH-O, and IH-G) which coexist with each other may be suitably allocated to the 8 resource slots. Data may be transmitted and received between nodes of each system.

Figure 3:
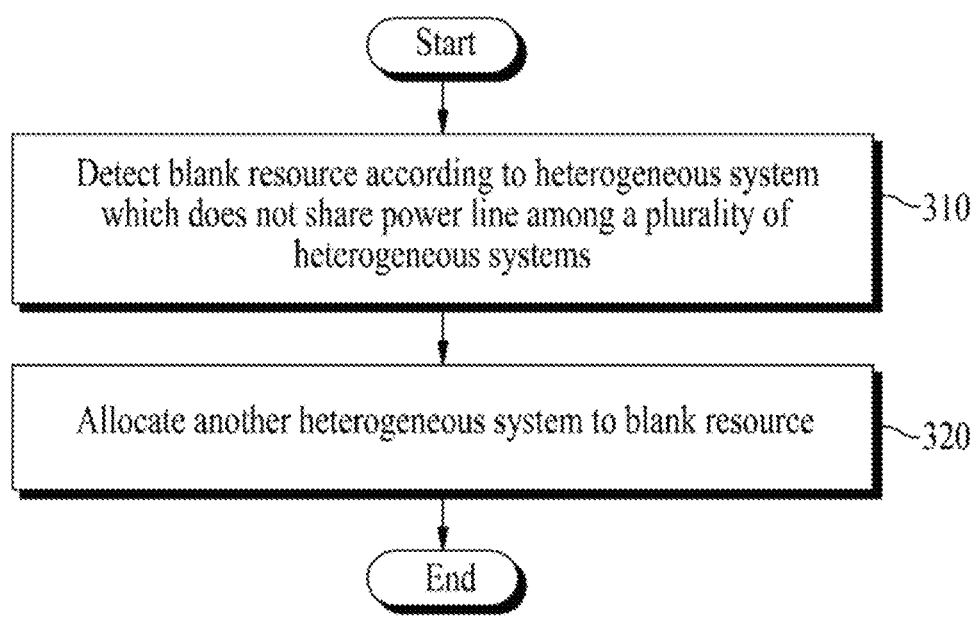
FIG. 3 is a flowchart illustrating an operation of a coexistence communication method for broadband power line communication according to an embodiment of the inventive concept.
Figure 4A:
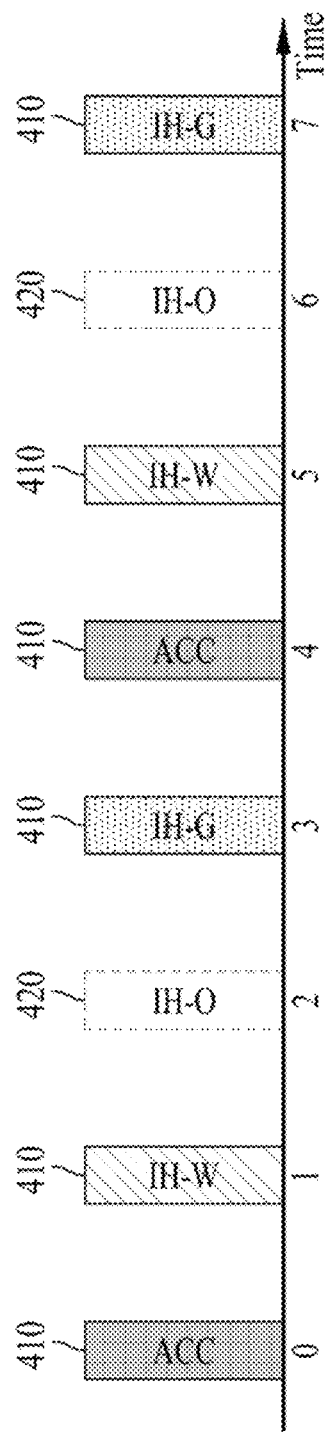
FIGS. 4A and 4B are drawings illustrating an example of allocating another heterogeneous system to a blank resource according to an embodiment of the inventive concept.
Figure 4B:
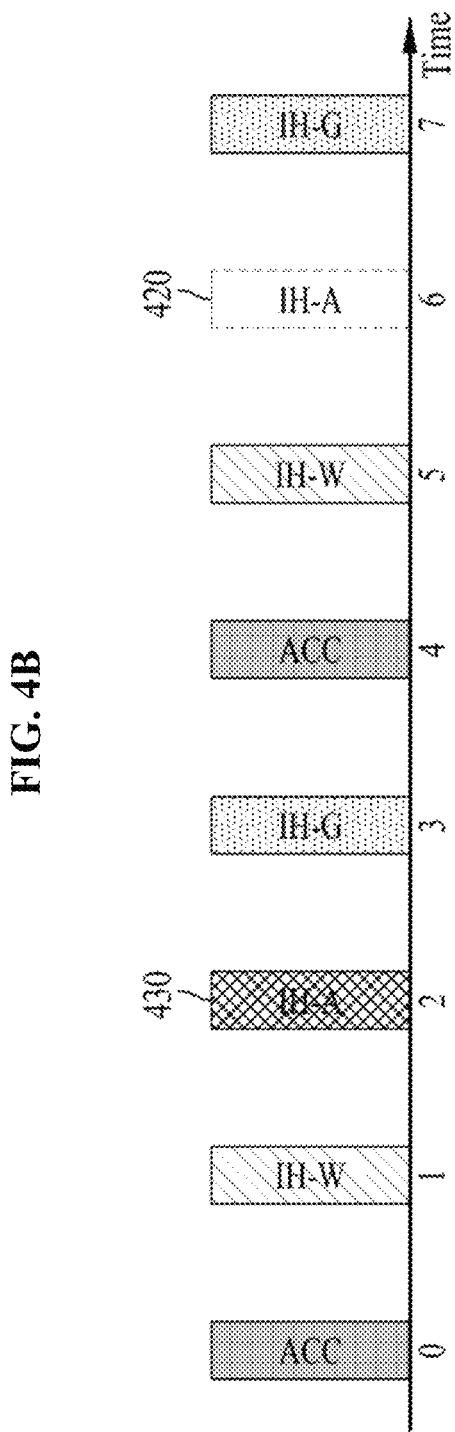

FIG. 3 is a flowchart illustrating an operation of a coexistence communication method for broadband power line communication according to an embodiment of the inventive concept. FIGS. 4A and 4B are drawings illustrating an example of allocating another heterogeneous system to a blank resource according to an embodiment of the inventive concept. FIG. 5 is a drawing illustrating a resource map according to an embodiment of the inventive concept.

Hereinafter, a description will be given in detail of the coexistence communication method for the broadband power line communication according to an embodiment of FIG. 3 with reference to FIGS. 4A, 4B, and 5.

Referring to FIG. 3, in operation 310, a blank resource according to a heterogeneous system which does not share a power line among a plurality of heterogeneous systems may be detected from data in which the plurality of heterogeneous systems which share the power line to perform power line communication are allocated to a plurality of TDMUs and in which each TDMU is allocated to a plurality of TDMSs sorted over time in a distribution scheme.

Referring to FIG. 4A, a corresponding TDMU shown in FIG. 4A may include a resource (a unit, a slot, or a phase vector) 410 of each of the plurality of heterogeneous systems allocated based on the resource map of FIG. 5.

In this case, the resource map of FIG. 5 may indicate a map in which at least one or more of the plurality of heterogeneous systems which perform power line communication are allocated to be continuous in 8 TDMSs in each of a plurality of TDMUs. For example, in the resource map, according to the plurality of heterogeneous systems shared on a power line of the corresponding TDMU, resources of the shared heterogeneous systems may be allocated to slots of the 8 TDMSs.

Thus, FIG. 4A illustrates that resources 410 of heterogeneous systems ACC, IH-W, and IH-G are allocated to TDMUs. Herein, there may be a heterogeneous system which does not share the power line among heterogeneous systems ACC, IH-W, IH-O, and IH-G. Due to this, there may be a blank resource in a plurality of TDMSs.

Operation 310 may be an operation of detecting a blank resource 420 according to a heterogeneous system which does not share the power line among the plurality of heterogeneous systems, from data in which the plurality of heterogeneous systems are allocated in a distribution scheme.

In detail, in operation 310, a blank resource 420 and a blank phase vector according to a heterogeneous system (e.g., IH-O in FIG. 4A) which does not share the power line may be detected from data in which heterogeneous systems which share the power line among the plurality of heterogeneous systems are allocated to be continuous in one TDMU based on a resource map.

In operation 320, added another heterogeneous system may be allocated to a blank resource.

Referring to FIG. 4B, in operation 320, a resource 430 of added another heterogeneous system IH-A may be allocated to the blank resource 420 of the heterogeneous system IH-O which does not share the power line. In this case, the heterogeneous systems ACC, IH-W, IH-O, and IH-G indicate that $T_H=4*T_{ISP}$, and the heterogeneous system IH-A indicates that $T_H=8*T_{ISP}$.

Figure 6:
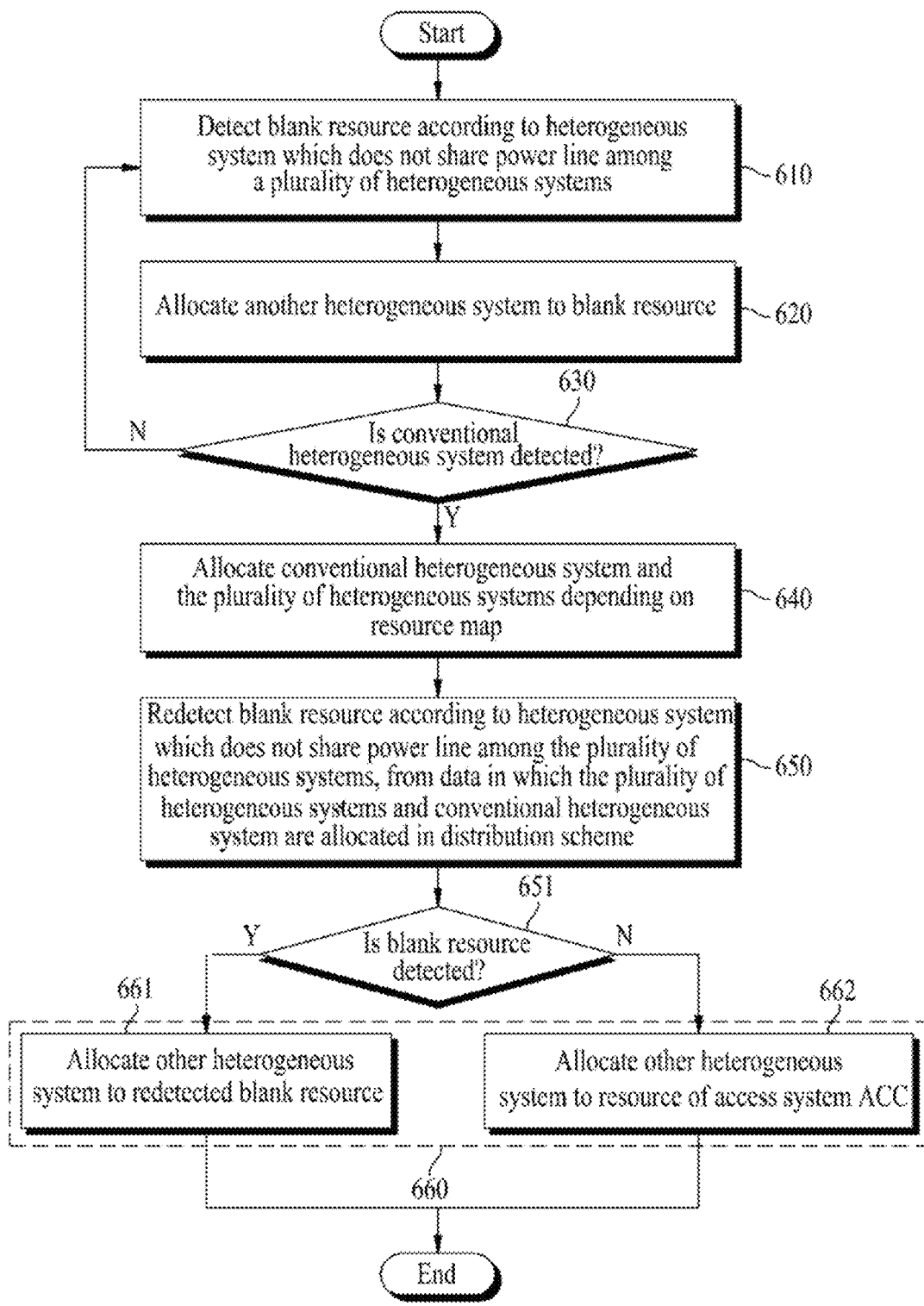
FIG. 6 is a flowchart illustrating an operation of a coexistence communication method for broadband power line communication according to another embodiment of the inventive concept.
Figure 7A:
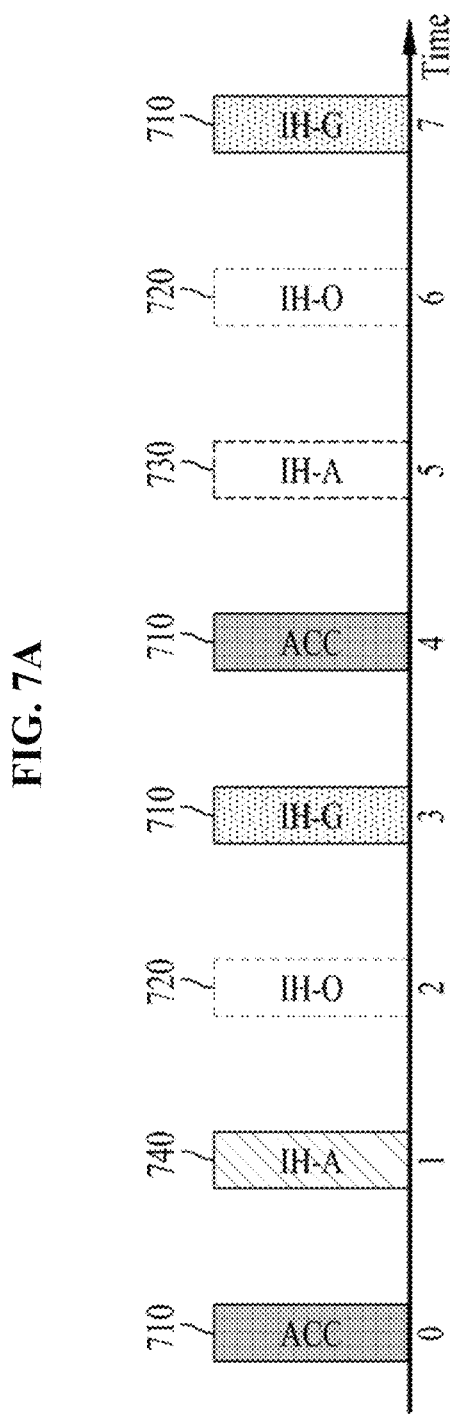
FIGS. 7A, 7B, and 7C are drawings illustrating an example of allocating another heterogeneous system to a redetected blank resource according to another embodiment of the inventive concept.
Figure 7B:
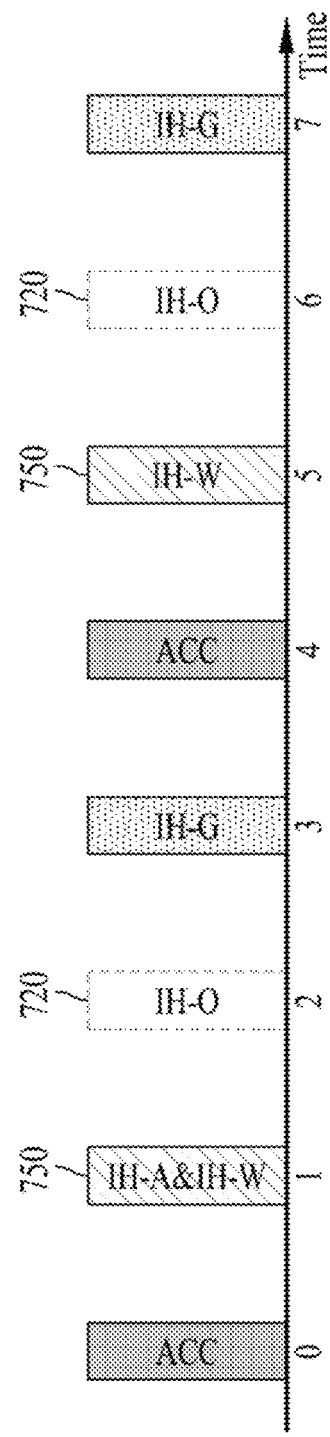
Figure 7C:
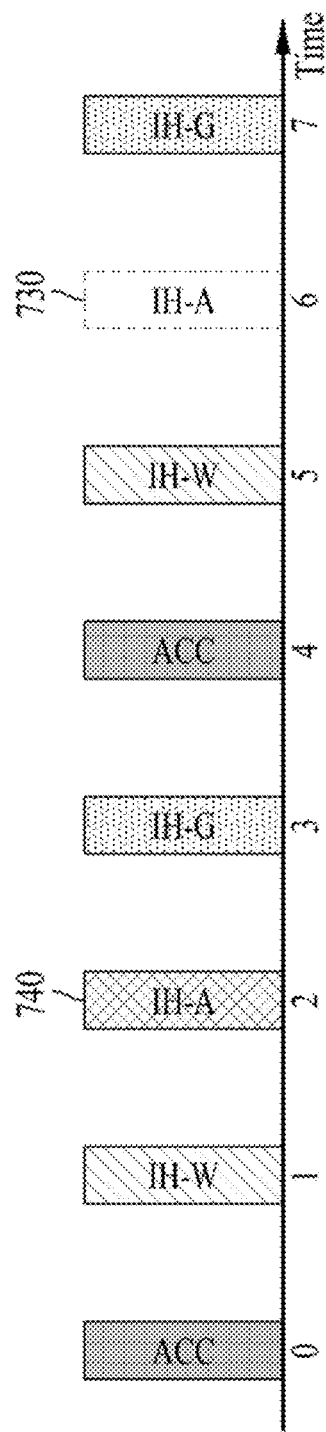

FIG. 6 is a flowchart illustrating an operation of a coexistence communication method for broadband power line communication according to another embodiment of the inventive concept. FIGS. 7A to 7C are drawings illustrating an example of allocating another heterogeneous system to a redetected blank resource according to another embodiment of the inventive concept.

In operation 610, a blank resource according to heterogeneous systems IH-W and IH-O which do not share a power line among a plurality of heterogeneous systems may be detected from data in which a plurality of heterogeneous systems ACC and IH-G which share the power line to perform power line communication are allocated to a plurality of TDMUs and in which each TDMU is allocated to a plurality of TDMSs sorted over time in a distribution scheme (operation 1).

Referring to FIG. 7A, it is shown that resources 710 of heterogeneous systems ACC and IH-G are allocated to TDMUs. Operation 610 may be an operation of detecting blank resources 720 and 730 according to the heterogeneous systems which do not share the power line among the plurality of heterogeneous systems, from data in which the plurality of heterogeneous systems are allocated in the distribution scheme.

In detail, in operation 610, the blank resources 720 and 730 and blank phase vectors according to heterogeneous systems (e.g., heterogeneous systems IH-W and IH-O in FIG. 7A) which do not share the power line may be detected from data in which heterogeneous systems which share the power line among the plurality of heterogeneous systems are allocated to be continuous in one TDMU based on a resource map.

In this case, the data in which each TDMU is allocated to the plurality of TDMSs shown in FIG. 7A in the distribution scheme may be allocated by index 10 or 11 of FIG. 5.

In operation 620, added another heterogeneous system IH-A may be allocated to a blank resource (operation 2).

In an example of FIG. 7A, heterogeneous systems which do not share the power line, in data where the plurality of heterogeneous systems are allocated to be continuous in the plurality of TDMSs, may be the heterogeneous system IH-W or IH-O. In operation 620, the added other heterogeneous system IH-A may be allocated to a blank resource 730 of the heterogeneous system IH-W. In this case, a resource 740 of the other heterogeneous system IH-A may be allocated to the blank resource 730 of the heterogeneous system IH-W which does not share the power line and may be allocated sequentially over time.

In more detail, the other heterogeneous system IH-A of FIG. 7A may be allocated to a first phase vector in the plurality of blank resources 720 and 730 and may transmit an ISP signal at an allocated ISP window.

In this case, an embodiment of the inventive concept may detect an ISP signal transmitted by each system to distinguish between the added other heterogeneous system IH-A and the heterogeneous system (e.g., the heterogeneous system IH-W or IH-O in FIG. 7A) which does not share the power line. For example, the other heterogeneous system IH-A may have a periodicity of $T_H$ being $8*T_{ISP}$, and the heterogeneous system IH-W or IH-O which does not share the power line may have a periodicity of $T_H$ being $4*T_{ISP}$. By such differentiation, in a power communication method according to another embodiment of the inventive concept, the other heterogeneous system IH-A and a conventional heterogeneous system IH-W or IH-O which is newly connected may be detected.

In operation 630, a resource of the conventional heterogeneous system IH-W included in the resource map among the plurality of heterogeneous systems may be detected from data in which the other heterogeneous system IH-A allocated to the blank resource and the plurality of heterogeneous systems ACC and IH-G are allocated to a plurality of TDMSs in the distribution scheme (operation 3).

Referring to FIG. 7B, operation 630 may be an operation of detecting the conventional heterogeneous system IH-W which is newly connected among the heterogeneous system IH-W or IH-O which does not share the power line. In this case, a method for separately detecting the other heterogeneous system IH-A and the conventional heterogeneous system IH-W which is newly connected among the heterogeneous system IH-W or IH-O which does not share the power line may be performed by a periodicity of the above-mentioned ISP signal.

For example, according to the periodicity of the ISP signal, the other heterogeneous system IH-A may indicate periodically iterative allocation and the conventional heterogeneous system IH-W may represent continuous allocation. Due to this, in operation 630, a phase vector of the other heterogeneous system indicating the periodically iterative allocation and a phase vector of the conventional heterogeneous system representing the continuous allocation may be separately detected.

In more detail, in allocated data as shown in index 10 or 11 of FIG. 5, that is, referring to FIGS. 7A and 7B, when the conventional heterogeneous system IH-W is newly connected among the heterogeneous system IH-W or IH-O which does not share the power line, in operation 630, the existence of the conventional heterogeneous system IH-W may be detected based on a periodicity of an ISP window. For example, because the other heterogeneous system IH-A indicates an ISP window periodicity of $4*T_{SIP}$ and because the conventional heterogeneous system IH-W represents a periodicity of $8*T_{ISP}$, in operation 630, the conventional heterogeneous system IH-W may be detected.

In operation 640, the detected conventional heterogeneous system IH-W and the plurality of heterogeneous systems ACC and IH-G may be allocated to the plurality of TDMSs in the distribution scheme depending on the resource map (operation 4).

As shown in FIG. 7B, when a resource 750 of the conventional heterogeneous system IH-W which is newly connected is detected among the heterogeneous system IH-W or IH-O which does not share the power line, in operation 640, the allocation of another heterogeneous system IH-A which uses a blank resource 720 according to the heterogeneous system which does not share the power line may be stopped, and the use of the resource 750 of the conventional heterogeneous system 750 may be started.

In operation 650, a blank resource according to the heterogeneous system IH-O which does not share the power line among the plurality of heterogeneous systems may be redetected from data in which the plurality of heterogeneous systems ACC and IH-G which share the power line to perform power line communication and the conventional heterogeneous system IH-W are allocated to the plurality of TDMSs in the distribution scheme (operation 5).

Referring to FIG. 7C, operation 650 may be an operation of redetecting a blank resource 720 according to the heterogeneous system IH-O which does not share the power line among the plurality of heterogeneous systems, from data in which the plurality of heterogeneous systems ACC and IH-G and the conventional heterogeneous system IH-W are allocated in the distribution scheme.

In detail, in operation 650, the blank resource 720 and a blank phase vector according to the heterogeneous system (e.g., the heterogeneous systems IH-O shown in FIG. 7C) which does not share the power line may be redetected from data in which heterogeneous systems ACC, IHG, and IH-W which share the power line among the plurality of heterogeneous systems are allocated to be continuous in one TDMU based on the resource map.

As an example, when the blank resource 720 is redetected in operation 651, in operation 661, the other heterogeneous system IH-A may be allocated to the redetected blank resource 730 (operation 6).

In an example of FIG. 7C, the heterogeneous system which does not share the power line in data where the plurality of heterogeneous systems are allocated to be continuous in the plurality of TDMSs may be the heterogeneous system IH-O. In operation 660, a resource 740 of added another heterogeneous system IH-A may be allocated to a blank resource 730 of the heterogeneous system IH-O.

In other words, when the conventional heterogeneous system IH-W is newly connected (750) while the other heterogeneous system IH-A uses a blank resource 740 of the conventional heterogeneous system IH-W, in the power communication method according to another embodiment of the inventive concept, the allocation of the resource for the conventional heterogeneous system IH-W, which is used by the other heterogeneous system IH-A, may be stopped. Thereafter, as shown in FIG. 7C, in the power line communication method according to another embodiment of the inventive concept, the other heterogeneous system IH-A may transmit an ISP signal of the heterogeneous system IH-O which does not share the power line at a period of $8*T_{ISP}$, and the blank resource 720 of the heterogeneous system IH-O which does not share the power line may be allocated to the other heterogeneous system IH-A.

As another example, when the blank resource 730 is not redetected in operation 651, in operation 662, the other heterogeneous system IH-A may be allocated to a resource of an access system ACC (operation 6).

Hereinafter, a description will be given in detail of operation 662 with reference to FIGS. 8 to 9C.

Figure 9A:
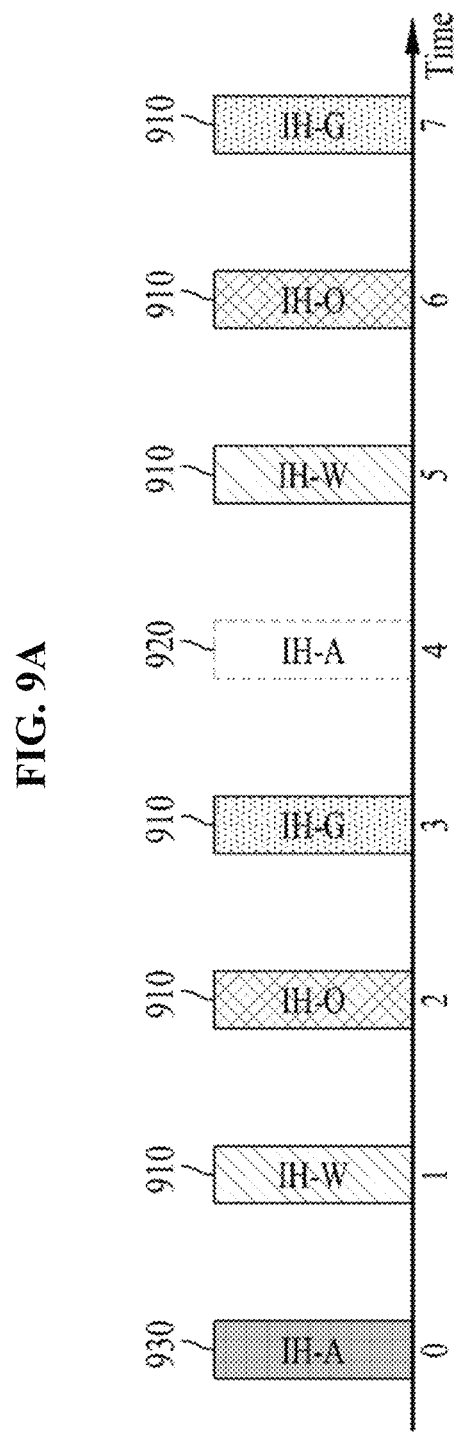
Figure 9B:
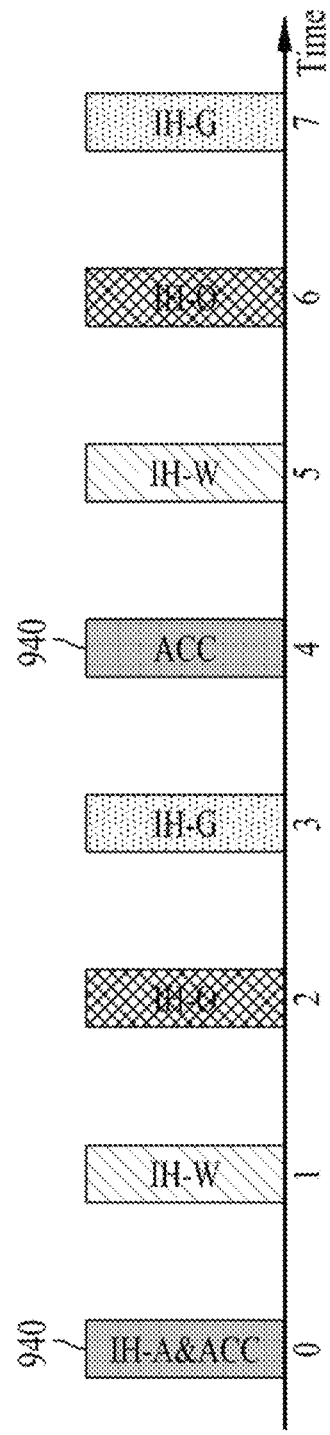

FIG. 8 is a drawing illustrating a resource map according to another embodiment of the inventive concept. FIGS. 9A to 9C are drawings illustrating an example of allocating another heterogeneous system to a resource of an access system according to another embodiment of the inventive concept.

Referring to FIG. 9A, after all of resources 910 of a plurality of heterogeneous systems ACC, IH-W, IH-O, and IH-G are allocated to a plurality of TDMSs, when a blank resource is not redetected in operation 651, in operation 662, a resource 930 of another heterogeneous system IH-A may be allocated to an access system ACC 920.

As shown in FIG. 9A, FIG. 8 illustrates an expanded TDM resource map in which the resource 930 of the other heterogeneous system IH-A is allocated to a TDMS of the access system. According to an embodiment, FIG. 8 illustrates an expanded and updated map after a TDMS of the access system is allocated to the other heterogeneous system IH-A in data allocated by an initial resource map shown in FIG. 5.

To distinguish between the other heterogeneous system IH-A and the access system ACC, the other heterogeneous system IH-A may transmit an ISP signal having a periodicity of $8*T_{ISP}$.

As described above, in a power line communication method according to another embodiment of the inventive concept, by differentiating the ISP signal, a resource 940 of an access system ACC which is newly connected as shown in FIG. 9B may be detected. When the newly connected access system ACC is detected, as shown in FIG. 9C, an embodiment of the inventive concept may stop using a resource for the other heterogeneous system IH-A which uses a resource of the access system ACC.

Figure 10:
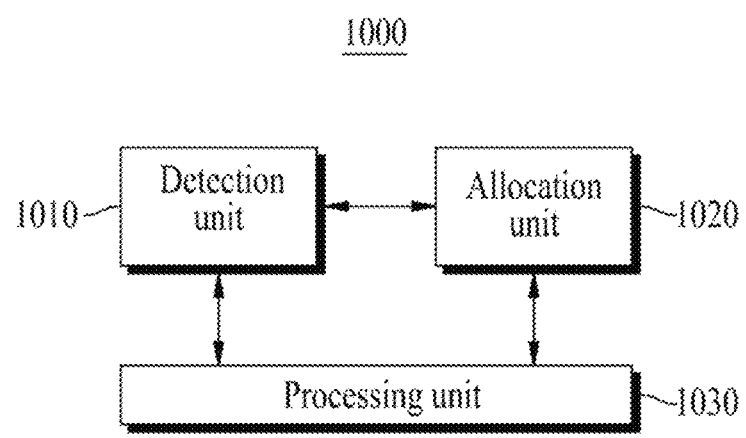
FIG. 10 is a block diagram illustrating a detailed configuration of a coexistence communication system for broadband power line communication according to an embodiment of the inventive concept.

FIG. 10 is a block diagram illustrating a detailed configuration of a coexistence communication system for broadband power line communication according to an embodiment of the inventive concept.

Referring to FIG. 10, a power line communication system 1000 according to an embodiment of the inventive concept may allocate a resource of another heterogeneous system to a blank resource in data where a plurality of heterogeneous systems are allocated to respective TDMUs in a distribution scheme.

To this end, the power line communication system 1000 according to an embodiment of the inventive concept may include a detection unit 1010 and an allocation unit 1020.

The detection unit 1010 may detect a blank resource according to a heterogeneous system which does not share a power line among a plurality of heterogeneous systems, from data in which the plurality of heterogeneous systems which share the power line to perform power line communication are allocated to a plurality of TDMUs and in which each TDMU is allocated to a plurality of TDMSs sorted over time in a distribution scheme.

The allocation unit 1020 may allocate added another heterogeneous system to a blank resource.

Thereafter, the detection unit 1010 may detect a resource of a conventional heterogeneous system which is newly connected, from data in which the other heterogeneous system allocated to the blank resource and the plurality of heterogeneous systems are allocated to the plurality of TDMUs in the distribution scheme. In this case, the conventional heterogeneous system may be a system included in a resource map among the plurality of heterogeneous systems.

The allocation unit 1020 may allocate the plurality of heterogeneous systems and the detected conventional heterogeneous system to the plurality of TDMUs in the distribution scheme depending on the resource map. The detection unit 1010 may redetect a blank resource according to a heterogeneous system which does not share the power line among the plurality of heterogeneous systems, from data in which the plurality of heterogeneous systems which share the power line to perform power line communication and the conventional heterogeneous system are allocated to the plurality of TDMSs in the distribution scheme.

As an example, when the blank resource according to the heterogeneous system which does not share the power line is redetected by the detection unit 1010, the allocation unit 1020 may allocate the other heterogeneous system to the redetected blank resource.

As another example, when the blank resource according to the heterogeneous system which does not share the power line is not redetected by the detection unit 1010, the allocation unit 1020 may allocate the other heterogeneous system to a resource of an access system ACC.

In this case, the detection unit 1010 may separately detect a phase vector of the other heterogeneous system indicating periodically iterative allocation and a phase vector of a conventional heterogeneous system indicating continuous allocation, based on a periodicity of an ISP signal.

Furthermore, the power line communication system 1000 according to an embodiment of the inventive concept may further include a processing unit 1030. The processing unit 1030 may update resource allocation, stop, and change for at least one or more of a plurality of heterogeneous systems, a conventional heterogeneous system, and the other heterogeneous system, which are allocated or changed to 8 TDMSs included in each TDMU with respect to a plurality of TDMUs, to the resource map.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

According to an embodiment of the inventive concept, the coexistence communication system may minimize a discontinuous control phenomenon to ensure system stability by efficiently allocating a blank resource which does not share data, in data where a plurality of heterogeneous systems which communicate in a coexistence form on a power line are allocated in a distribution scheme.

Furthermore, according to an embodiment of the inventive concept, the coexistence communication system may effectively allocate a resource without waste of resources and may minimize signal interference by separately detecting data allocation of a plurality of heterogeneous systems and data allocation of added another heterogeneous system, primarily allocating a resource of a conventional heterogeneous system specified in a resource map, and efficiently allocating the other heterogeneous system to a blank resource.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. A coexistence communication method for broadband power line communication, the method comprising:
   detecting a blank resource according to a heterogeneous system which does not share a power line among a plurality of heterogeneous systems, from data in which the plurality of heterogeneous systems which share the power line to perform power line communication are allocated to a plurality of time division multiplex units (TDMUs) and in which each TDMU is allocated to a plurality of time division multiplex slots (TDMSs) sorted over time in a distribution scheme;
   allocating an added other heterogeneous system to the blank resource; and
   detecting a resource of a conventional heterogeneous system included in a resource map among the plurality of heterogeneous systems, from data in which the added other heterogeneous system allocated to the blank resource and the plurality of heterogeneous systems are allocated to the plurality of TDMSs in the distribution scheme.

2. The method of claim 1, wherein the heterogeneous system which does not share the power line, the added other heterogeneous system, and the conventional heterogeneous system indicate periodicities of different ISP signals.

3. The method of claim 1, wherein the detecting of the resource of the conventional heterogeneous system includes:
   separately detecting a phase vector of the added other heterogeneous system indicating periodically iterative allocation and a phase vector of the conventional heterogeneous system indicating continuous allocation.

4. The method of claim 1, wherein the detecting of the blank resource includes:
   redetecting the blank resource according to the heterogeneous system which does not share the power line among the plurality of heterogeneous systems, from data in which the plurality of heterogeneous systems which share the power line to perform the power line communication and the conventional heterogeneous system are allocated to the plurality of TDMSs in the distribution scheme, and
   wherein the allocating of the added other heterogeneous system to the blank resource includes:
   allocating the added other heterogeneous system to the redetected blank resource.

5. The method of claim 4, wherein the allocating of the added other heterogeneous system to the blank resource includes:
   allocating the added other heterogeneous system to a resource of an access system among the TDMSs in which the plurality of heterogeneous systems are allocated in the distribution scheme, when the blank resource is not redetected.

6. The method of claim 1, wherein the detecting of the blank resource includes:
   detecting a blank resource and a blank phase vector according to the heterogeneous system which does not share the power line, from data in which heterogeneous systems which share the power line among the plurality of heterogeneous systems are allocated to be continuous in one TDMU based on the resource map.

7. The method of claim 6, wherein the resource map indicates a map in which at least one or more of the plurality of heterogeneous systems which perform the power line communication are allocated to be continuous in 8 TDMSs in each of the plurality of TDMUs.

8. The method of claim 6, wherein the allocating of the added other heterogeneous system to the blank resource includes:
   allocating the added other heterogeneous system which is not included in the plurality of heterogeneous systems to the blank resource and the blank phase vector.

9. A coexistence communication method for broadband power line communication, the method comprising:
   detecting a blank resource according to a heterogeneous system which does not share a power line among a plurality of heterogeneous systems, from data in which the plurality of heterogeneous systems which share the power line to perform power line communication are allocated to a plurality of time division multiplex units (TDMUs) and in which each TDMU is allocated to a plurality of time division multiplex slots (TDMSs) sorted over time in a distribution scheme;
   allocating an added other heterogeneous system to the blank resource;
   detecting a resource of a conventional heterogeneous system included in a resource map among the plurality of heterogeneous systems, from data in which the added other heterogeneous system allocated to the blank resource and the plurality of heterogeneous systems are allocated to the plurality of TDMSs in the distribution scheme;

allocating the detected conventional heterogeneous system and the plurality of heterogeneous systems to the plurality of TDMSs in the distribution scheme depending on the resource map;

redetecting the blank resource according to the heterogeneous system which does not share the power line among the plurality of heterogeneous systems, from data in which the plurality of heterogeneous systems which share the power line to perform the power line communication and the conventional heterogeneous system are allocated to the plurality of TDMSs in the distribution scheme; and allocating the added other heterogeneous system to the redetected blank resource.

10. The method of claim 9, wherein the detecting of the resource of the conventional heterogeneous system includes:

separately detecting a phase vector of the added other heterogeneous system indicating periodically iterative allocation and a phase vector of the conventional heterogeneous system indicating continuous allocation.

11. The method of claim 9, wherein the allocating of the redetected blank resource includes:

allocating the added other heterogeneous system to a resource of an access system among the TDMSs in which the plurality of heterogeneous systems are allocated in the distribution scheme, when the blank resource is not redetected.

12. A coexistence communication system for broadband power line communication, the system comprising:

a detection unit configured to detect a blank resource according to a heterogeneous system which does not share a power line among a plurality of heterogeneous systems, from data in which the plurality of heterogeneous systems which share the power line to perform power line communication are allocated to a plurality of time division multiplex units (TDMUs) and in which each TDMU is allocated to a plurality of time division multiplex slots (TDMSs) sorted over time in a distribution scheme;

an allocation unit configured to allocate an added other heterogeneous system to the blank resource; and a processing unit configured to update at least one or more of the plurality of heterogeneous systems which are allocated or changed to a plurality of 8 TDMSs included in each TDMU with respect to the plurality of TDMUs, a conventional heterogeneous system, and the added other heterogeneous system to a resource map.

13. The system of claim 12, wherein the heterogeneous system which does not share the power line, the added other heterogeneous system, and the conventional heterogeneous system indicate periodicities of different ISP signals.

14. The system of claim 12, wherein the detection unit detects a resource of the conventional heterogeneous system included in the resource map among the plurality of heterogeneous systems, from data in which the added other heterogeneous system allocated to the blank resource and the plurality of heterogeneous systems are allocated to the plurality of TDMSs in the distribution scheme.

15. The system of claim 14, wherein the detection unit redetects the blank resource according to the heterogeneous system which does not share the power line among the plurality of heterogeneous systems, from data in which the plurality of heterogeneous systems which share the power line to perform the power line communication and the conventional heterogeneous system are allocated to the plurality of TDMSs in the distribution scheme.

16. The system of claim 15, wherein the detection unit separately detects a phase vector of the added other heterogeneous system indicating periodically iterative allocation and a phase vector of the conventional heterogeneous system indicating continuous allocation.

17. The system of claim 15, wherein the allocation unit allocates the added other heterogeneous system to the redetected blank resource.

* * * * *